(12) United States Patent  (10) Patent No.: US 9,162,572 B2
Pink et al.  (45) Date of Patent: Oct. 20, 2015

(54) INTERACTIVE ATTENTIVENESS ENHANCEMENT

(71) Applicants: Oliver Pink, Abstatt (DE); Felix Wulf, Ludwigsburg (DE); Daniel Oeschger, Bremerhaven (DE)

(72) Inventors: Oliver Pink, Abstatt (DE); Felix Wulf, Ludwigsburg (DE); Daniel Oeschger, Bremerhaven (DE)

(73) Assignee: ROBERT BOSCH GMBH, Stuttgart (DE)

( * ) Notice: Subject to any disclaimer, the term of this patent is extended or adjusted under 35 U.S.C. 154(b) by 94 days.

(21) Appl. No.: 14/012,837

(22) Filed: Aug. 28, 2013

(65) Prior Publication Data

US 2014/0091917 A1 Apr. 3, 2014

(30) Foreign Application Priority Data

Aug. 30, 2012 (DE) .......................... 10 2012 215 397

(51) Int. Cl.
*B60Q 1/00* (2006.01)
*B60K 28/02* (2006.01)
*B60K 28/06* (2006.01)
*B60W 50/14* (2012.01)

(52) U.S. Cl.
CPC ................. *B60K 28/02* (2013.01); *B60K 28/06* (2013.01); *B60W 50/14* (2013.01)

(58) Field of Classification Search
CPC .............. G06Q 30/08; G06Q 30/0251; G06Q 30/0254; G06Q 30/0255; G06Q 30/0269; G06Q 30/0271; G06Q 40/00; G06Q 40/04; G06Q 50/188; G06Q 10/10; G06Q 20/401; G06Q 30/0207; G06Q 40/025; G06Q 40/06
USPC .............. 340/439, 539.22, 539.26, 438, 441, 340/436.35, 426.23, 426.25, 426.14, 340/995.13, 447, 463–469
See application file for complete search history.

(56) References Cited

U.S. PATENT DOCUMENTS

| 8,775,046 | B2 * | 7/2014 | Kaster et al. ..................... 701/70 |
| 2004/0048655 | A1 * | 3/2004 | Yoshioka ......................... 463/23 |
| 2004/0178576 | A1 * | 9/2004 | Hillis et al. ............... 273/148 B |
| 2007/0142169 | A1 * | 6/2007 | Marcil ........................... 477/107 |
| 2009/0125161 | A1 * | 5/2009 | Baur et al. ........................ 701/1 |

FOREIGN PATENT DOCUMENTS

| DE | 10 2004 034 748 | 2/2006 |
| DE | 10 2012 035 718 | 3/2012 |

* cited by examiner

*Primary Examiner* — Daniel Previl
(74) *Attorney, Agent, or Firm* — Kenyon & Kenyon LLP

(57) ABSTRACT

A method for interactive attentiveness enhancement of a vehicle driver includes steps of determining that a driver assistance function for semiautomatic control of the motor vehicle is active, detecting a stimulus which may be experienced by the vehicle driver upon an observation of the surroundings of the motor vehicle, detecting an input of the vehicle driver in response to the stimulus, determining a game result based on the input and the stimulus, and outputting a notice concerning the game result.

19 Claims, 3 Drawing Sheets

INTERACTIVE ATTENTIVENESS ENHANCEMENT

FIELD OF THE INVENTION

The present invention relates to a technique for interactive attentiveness enhancement, in particular for a driver of a motor vehicle.

BACKGROUND INFORMATION

A modern motor vehicle has a number of so-called driver assistance functions, in order to relieve a driver of the motor vehicle. Routine tasks during driving of the motor vehicle are automatically or semiautomatically carried out by a device or a system. Such a driver assistance system is frequently configured to return control over the motor vehicle to the driver as soon as a situation is detected which may not be handled by the system. For the longitudinal control of the vehicle, i.e., the movement and speed control in the travel direction, systems are known which may regulate the speed of the vehicle partially or completely automatically. For example, a predetermined target speed may be maintained, the speed of the vehicle being automatically reduced if it travels excessively close to a preceding. In some specific embodiments, the speed of the motor vehicle may be regulated down to a standstill, and under certain circumstances restarting of the motor vehicle may also be controlled if the person in front stops or drives away again ("ACC stop and go").

For the lateral control of the motor vehicle, i.e., the directional control to the right or left, systems are known which keep the motor vehicle between lane markings on the roadway, as long as the driver keeps his hands on the steering wheel.

While such systems relieve the vehicle driver of routine tasks, the vehicle driver may perceive his driving activity to be monotonous due to this relief, so that he possibly no longer generates the attentiveness required for safe control of the motor vehicle. In a known system for warning of decreased attentiveness, the vehicle driver is monitored with the aid of an interior camera and a driver assistance function is deactivated if the vehicle driver does not display the impression of sufficient concentration on an outside area of the motor vehicle.

The present invention is based on the object of providing a method, a computer program product, and a device, in order to increase the attentiveness of a vehicle driver while driving a motor vehicle having a semiautomatic driver assistance function.

SUMMARY

A method for interactive attentiveness enhancement of a vehicle driver includes steps of determining that a driver assistance function for semiautomatic control of the motor vehicle is active, detecting a stimulus which may be experienced by the vehicle driver upon an observation of the surroundings of the motor vehicle, detecting an input of the vehicle driver in response to the stimulus, determining a game result based on the input and the stimulus, and outputting a notice concerning the game result.

According to the present invention, the vehicle driver is encouraged to play a game, in the case of which he may only be successful if he observes the surroundings of the motor vehicle sufficiently attentively. The nature and the goal of the game may be of subordinate significance. The attentiveness of the vehicle driver may thus be oriented in a reasonable and pleasant manner onto the outside area of the motor vehicle. An acceptance of the vehicle driver for attentiveness enhancement may be increased by achieving success in the game.

Furthermore, in one preferred specific embodiment, a signal is output if the game result is below a predetermined value. The predetermined value may reflect in particular how much time lies between a stimulus and a corresponding input of the vehicle driver. In another specific embodiment, the signal may indicate an intermediate state or an end state of the game. The signal may be output to the vehicle driver in order to notify him that his outwardly directed attentiveness is possibly inadequate for safely controlling the motor vehicle. The vehicle driver may thus note a distraction in a timely manner before he possibly makes an incorrect driving decision and may actively withdraw from the distraction. The distraction may include a conversation with another person or the operation of a device such as an entertainment system, in particular an audio system, for example.

In one specific embodiment, the signal influences the driver assistance function. For example, in the case of a cruise control, a minimum distance to a preceding vehicle may be increased if the low game result indicates reduced attentiveness of the vehicle driver. In another specific embodiment, the driver assistance function may also be deactivated if the vehicle driver is found to be insufficiently attentive. General safety with which the motor vehicle is controlled may thus be increased.

In a first variant of the method, the stimulus may be determined based on a traffic situation in the area of the motor vehicle. Preferably, in contrast to known methods for attentiveness judgment of a vehicle driver, a stimulus is observed which generally does not result in a reaction of the vehicle driver with respect to the control of the motor vehicle. Instead, the reaction is motivated by the game. The reaction preferably does cause a driving function of the motor vehicle, for example, a speed or a lane choice, but the motivation takes place in such a way that the reaction does not result in a hazardous or unexpected maneuver. For example, it may be the goal of the game to prompt the driver to judge a distance to a preceding vehicle, the actual distance being determined with the aid of a radar sensor from the traffic situation, for example. If the estimation of the vehicle driver is sufficiently good, he is thus apparently sufficiently attentive.

In another variant, which may be combined with the above-mentioned variant, the stimulus is output to the vehicle driver within the scope of the method. The output may generally be carried out acoustically, visually, or haptically, the output stimulus preferably being superimposed with a directly perceptible stimulus from the surroundings of the motor vehicle. For example, a visual field display (head-up display HUD) may be used, in order to superimpose or apply additional information onto the visually perceptible traffic situation in the area of the motor vehicle. This additional information is preferably related to the perceptible traffic situation. In this variant also, a reaction or input of the vehicle driver is preferably detected, which is not necessary or is not to be expected for routine control of the motor vehicle.

A frequency of the output of the stimulus may be dependent on a speed of the motor vehicle. In different specific embodiments, stimuli may be output more frequently or less frequently with increasing speed of the motor vehicle. The attentiveness of the vehicle driver may thus be adapted individually to the requirements of a present traffic situation of the motor vehicle.

In both variants, the stimulus may relate to a relative position of a nearby motor vehicle. The attentiveness of the vehicle driver may thus be intentionally directed to a nearby motor vehicle, for example, to avoid the risk of a collision with this motor vehicle or an obstruction of this motor vehicle.

In one specific embodiment, the driver assistance function relates to at least one of a longitudinal controller and a transverse controller of the motor vehicle. The movement controller of the motor vehicle in the longitudinal and transverse directions may be relevant for operational safety of the motor vehicle and its occupants, so that excessive relief of the motor vehicle in these fields by a driver assistance function may most strongly impair his attentiveness. Due to the game-related focusing of the driver attentiveness on events of the longitudinal or transverse control, the loss of attentiveness caused by the driver assistance system may be compensated for.

A computer program product according to the present invention includes program code for carrying out the described method when the computer program product runs on a processing unit or is stored on a computer-readable data carrier. An infrastructure which is already installed on board a motor vehicle for other reasons may be made capable of carrying out the described method with the aid of the computer program product.

A device according to the present invention for interactive attentiveness enhancement of a vehicle driver includes a unit for detecting that a driver assistance function for semiautomatic control of the motor vehicle is active, a first interface for detecting a stimulus, which may be experienced by the vehicle driver in the event of an observation of the surroundings of the motor vehicle, a second interface for the connection to an input unit for the vehicle driver on board the motor vehicle, a processing unit, which is configured for the purpose of determining a game result based on the input and the stimulus, and a third interface for the connection to an output unit for outputting the game result.

With the aid of the interfaces, the processing unit may be connected to systems or subsystems of a known motor vehicle in order to carry out the above-described method. The interfaces may also be wireless, so that the processing unit may easily be removable from the motor vehicle. In one specific embodiment, a portable computer or a telephone having additional functions ("smart phone") may include the processing unit.

In one preferred specific embodiment, the device includes a memory for accommodating a sequence controller of a game based on stimuli and inputs. The sequence controller may be designed in particular as a computer program product. Different sequence controllers may define different games. A favorite game may thus be reproduced or a disliked game may be replaced by a new game which is still unknown to the vehicle driver. In this way, monotony of the game used by the method or the device for the vehicle driver may be avoided.

In one preferred specific embodiment, a fourth interface may be provided for receiving a sequence controller to be stored in the memory. Exchanging games may thus be made even easier.

DETAILED DESCRIPTION

Figure 1:
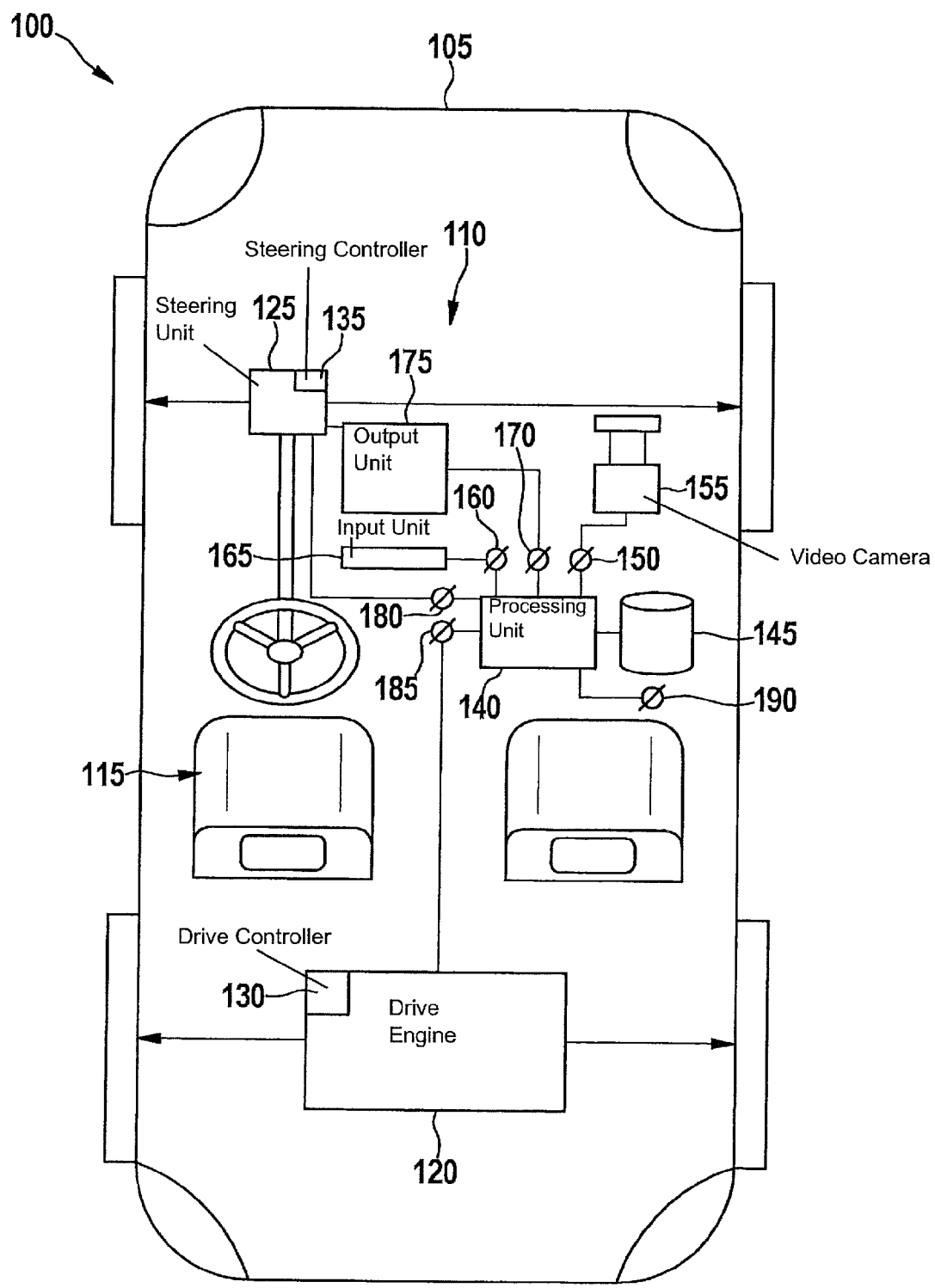
FIG. 1 shows a motor vehicle having a device for interactive attentiveness enhancement of the vehicle driver.

FIG. 1 shows a system 100, which includes a motor vehicle 105 and a device 110 attached therein for attentiveness enhancement of a vehicle driver 115. Motor vehicle 105 includes, in the exemplary specific embodiment shown, a drive engine 120 and a steering unit 125. With the aid of drive engine 120, a longitudinal control of motor vehicle 105, i.e., a cruise control, may be carried out, while a transverse control, i.e., a directional control of motor vehicle 105, may be carried out with the aid of steering unit 125.

Drive engine 120 may include a drive controller 130, which implements a driver assistance system for the longitudinal control of motor vehicle 105. In a similar way, steering unit 125 may include a steering controller 135, which implements a driver assistance system for the transverse control of motor vehicle 105, for example, a lane assistant. The control of motor vehicle 105 may preferably still be influenced by vehicle driver 115 even if drive controller 130 or steering controller 135 is activated.

Device 110 includes a processing unit 140, which preferably contains a memory unit 145 and may be connected to motor vehicle 105 with the aid of a number of interfaces. In a specific embodiment other than the one shown, several of the interfaces described hereafter may also be combined. Each of the interfaces may also be implemented wirelessly. Processing unit 140, optionally including memory unit 145, may thus be removable from motor vehicle 105. In particular, processing unit 140 may be included in a portable computer or a telephone having additional functions ("smart phone").

A first interface 150 is connectable to a video camera 155 or another unit for scanning the surroundings of motor vehicle 105. Information from the surroundings of motor vehicle 105 may be scanned with the aid of first interface 150, from which a stimulus, which may be experienced by vehicle driver 115 upon observing the surroundings of motor vehicle 105, may be determined.

A second interface 160 may be connected to an input unit 165 on board motor vehicle 105. Input unit 165 may be operable in a tactile or acoustic way. In one specific embodiment, input unit 165 includes a dedicated input element, while in another specific embodiment, an already existing input element is sampled. For example, a steering wheel for operating steering unit 125 or a gas pedal for controlling drive engine 120 or drive controller 130 may be used as an input element.

A third interface 170 is provided for the connection to an output unit 175. Output unit 175 may provide information to vehicle driver 115 acoustically, visually, or haptically. In a particularly preferred specific embodiment, output unit 175 includes a visual field display (head-up display).

With the aid of visual field display 175, visual information may be reflected into a field of vision of vehicle driver 115, so that the information is perceptible to the vehicle driver, while he may simultaneously perceive the surroundings of motor vehicle 105.

A fourth interface 180 is provided for the connection to steering unit 125 or steering controller 135. A fifth interface 185 is connectable in a corresponding way to drive engine 120 or drive controller 130. Information may be acquired by processing unit 140 with the aid of interfaces 180 and 185, which permit it to conclude whether or not a driver assistance function for semiautomatic control of motor vehicle 105 is active.

In a specific embodiment different from that shown, elements, which are connectable to processing unit 140 with the aid of one of interfaces 150, 160, or 170, may be included by device 110, for example, one of controllers 130 or 140.

Processing unit 140 is configured for the purpose of directing the attentiveness of vehicle driver 115 to an outside area of motor vehicle 105 in a playful way. To implement such a game, processing unit 140 may execute a computer program product, which establishes a sequence of playful interactions between vehicle driver 115 and device 110 in the meaning of a playful idea. Multiple such sequence controllers may be stored, for example, in memory unit 145. A sixth interface 190 may be provided for exchanging sequence controllers, both uploading of a sequence controller to processing unit 140 or storage unit 145 and also downloading therefrom preferably being possible. Sixth interface 190 may be wireless in particular and may allow an exchange of sequence controllers between multiple motor vehicles 105, for example.

Figure 2:
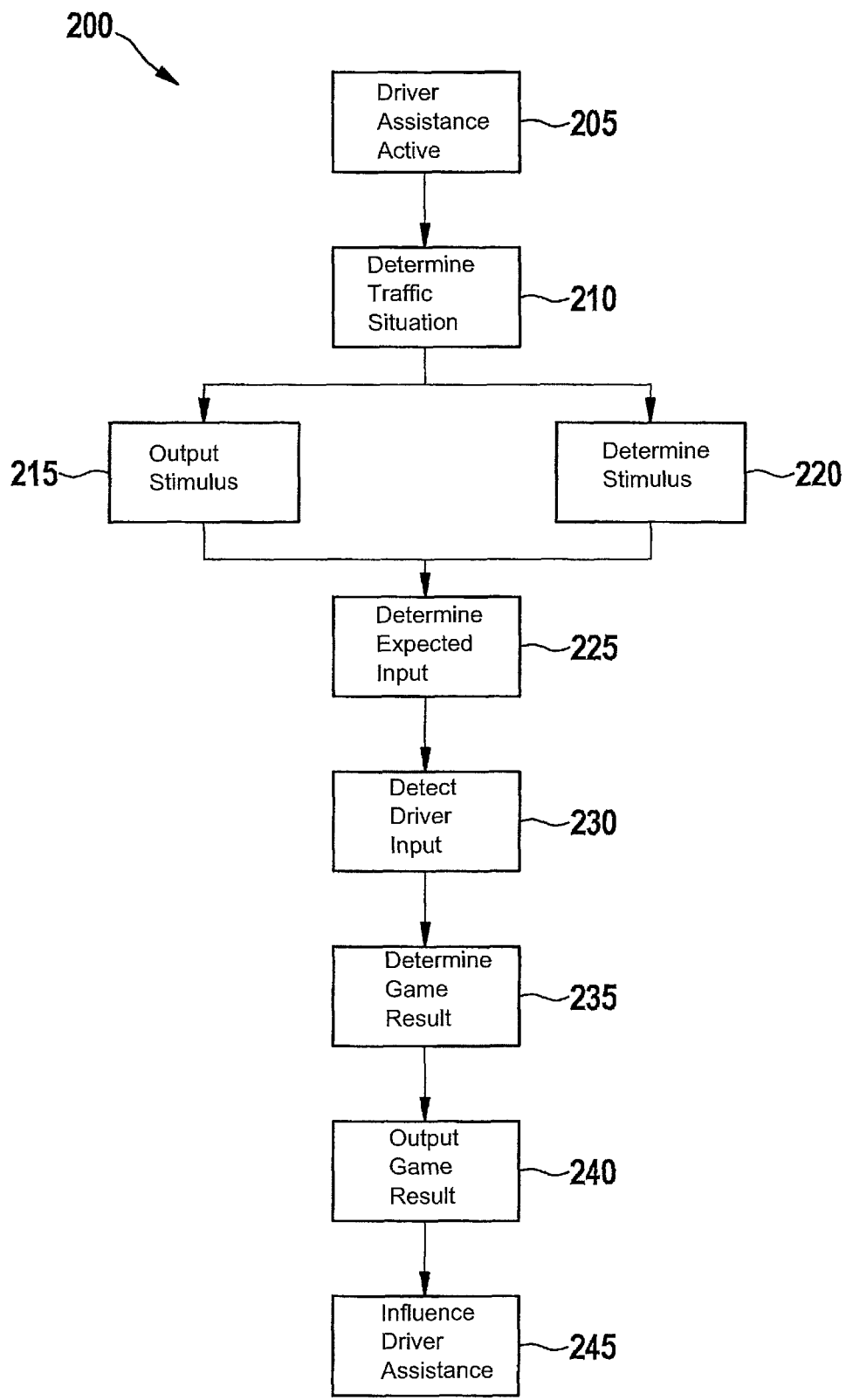
FIG. 2 shows a flow chart of a method for interactive attentiveness enhancement of a vehicle driver of the motor vehicle from FIG. 1.

FIG. 2 shows a flow chart of a method 200 for interactive attentiveness control of vehicle driver 115 of motor vehicle 105 from FIG. 1. Method 200 may be executed in particular on processing unit 140 of device 110.

In a first step 205, it is determined that a driver assistance function for semiautomatic control of motor vehicle 105 is active. For this purpose in particular, information may be acquired via one of interfaces 180 or 185 from one of control units 130 or 135 for controlling a longitudinal or transverse control of motor vehicle 105.

In a subsequent step 210, which is optional, a traffic situation in the area of motor vehicle 105 is determined This may take place with the aid of interface 150 and video camera 155, for example, relative positions of nearby motor vehicles in relation to motor vehicle 105 being determined, for example.

In a first alternative, a stimulus is subsequently output to vehicle driver 115 in a step 215. The stimulus is preferably determined as a function of the traffic situation, for example, as a function of a speed of motor vehicle 105. In a second alternative, in a step 220, the traffic situation is only detected and a stimulus is determined based on the detected information. As a function of a game explained in greater detail hereafter, the stimulus may include, for example, two red vehicles driving next to one another in the surroundings of motor vehicle 105 being detected. The variants of steps 215 and 220 are also combinable with one another.

Following one of steps 215 or 220, an expected input of vehicle driver 115 is determined in a step 225. The input is oriented to the determined or output stimulus and is used for the purpose of defining a handling goal of vehicle driver 115 in the meaning of the game.

In a subsequent step 230, an input of vehicle driver 115 is detected, which occurs in reaction to the determined or output stimulus. After detection of the input, a game result is determined in step 235 based on the input and the stimulus. The game result may be based, for example, on an evaluation of a relationship of the detected input with the determined stimulus or a chronological relationship of the stimulus and the input. Subsequently, the determined game result is output in an optional step 240. The output may take place with the aid of output unit 175, for example.

In an optional step 245, driver assistance function 130, 135 is influenced based on the game result. For example, driver assistance function 130, 135 may be deactivated if the game result determined in step 235 does not reach a predetermined value.

Figure 3A:
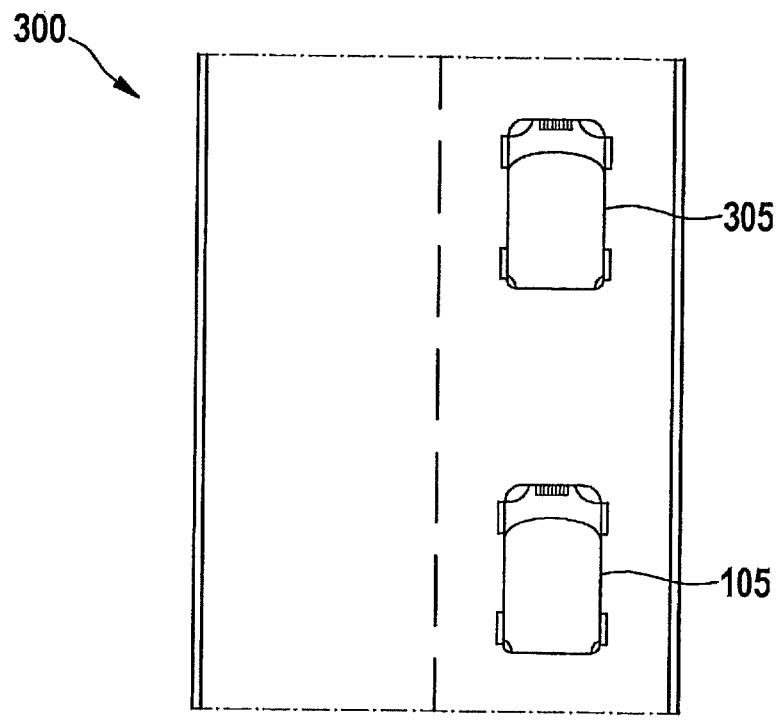
FIG. 3A shows an illustration of games for interactive attentiveness enhancement of the vehicle driver of FIG. 1 or 2.

FIG. 3A shows an illustration of a first game for interactive attentiveness enhancement of vehicle driver 115 of FIG. 1 or 2. In the illustrated game, the task of vehicle driver 115 is, for example, to estimate a distance to a preceding motor vehicle 305. An input may take place with the aid of input unit 165, for example. In another specific embodiment, it may be predefined with the aid of output unit 175 how great the distance to preceding motor vehicle 305 is to be and vehicle driver 115 may set the preferably matching distance by influencing drive engine 120 accordingly.

In another specific embodiment, a so-called "shooter" game may be played. It is the task of vehicle driver 115 to virtually "shoot down" objects which are artificially reflected into the real scene or to hit a specific point of preceding motor vehicle 305, for example, the first letter of the motor vehicle license plate.

Figure 3B:
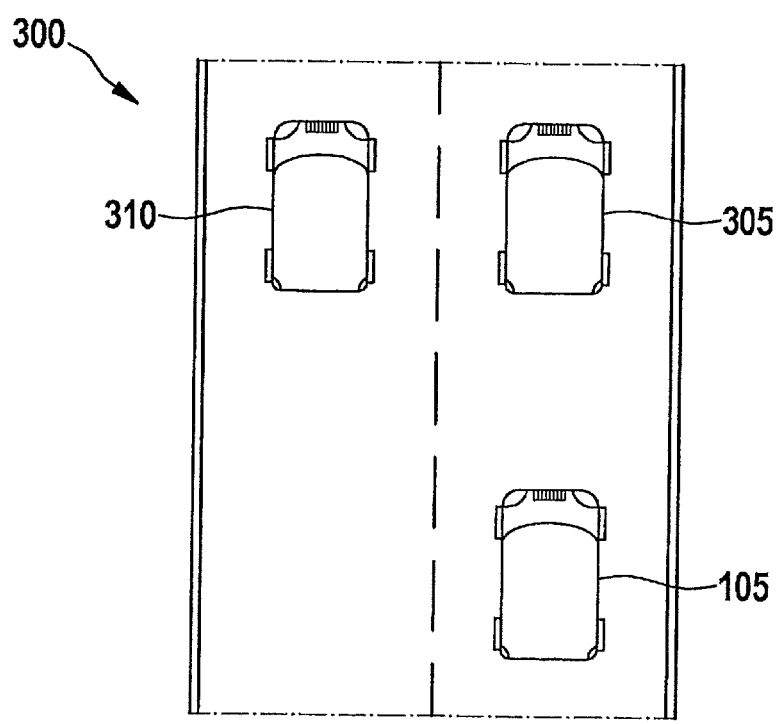
FIG. 3B shows an illustration of further games similar to the illustration of FIG. 3A.

FIG. 3B shows an illustration of further games similar to the illustration of FIG. 3A. For example, the task of vehicle driver 115 here is to move multiple preceding motor vehicles 305, 310 into a row, as is known, for example, from the game "Tetris." In still another game, it may be the task of vehicle driver 115, for example, to virtually "bowl down" motor vehicles 305, 310 located in front of him.

Still further games are conceivable. In any case, the games are configured for the purpose of directing the attentiveness of vehicle driver 115 onto the outside area of motor vehicle 105.

What is claimed is:

1. A method for interactive attentiveness enhancement of a vehicle driver, comprising:
   determining that a driver assistance function for semiautomatic control of a motor vehicle is active;
   detecting a stimulus capable of being experienced by the vehicle driver upon an observation of surroundings of the motor vehicle;
   detecting an input of the vehicle driver in response to the stimulus;
   determining a game result based on the input and the stimulus, wherein the game result is a valuation of a degree of attentiveness of the vehicle driver; and
   outputting a notice concerning the game result.

2. The method as recited in claim 1, further comprising:
   outputting a signal if the game result is below a predetermined value.

3. The method as recited in claim 2, wherein the signal influences the driver assistance function.

4. The method as recited in claim 3, further comprising deactivating the driver assistance function in response to the signal being below a threshold value.

5. The method of claim 2, wherein the game result is below a predetermined value responsive to a determination that a time between the stimulus and input by the vehicle driver exceeds a threshold value.

6. The method as recited in claim 1, further comprising:
   determining the stimulus based on a traffic situation in an area of the motor vehicle.

7. The method as recited in claim 1, further comprising:
   outputting the stimulus to the vehicle driver.

8. The method as recited in claim 7, wherein a frequency of outputting the stimulus is dependent on a speed of the motor vehicle.

9. The method of claim 8, wherein the frequency of outputting the stimulus is adapted to a traffic situation.

10. The method as recited in claim 1, wherein the stimulus relates to a relative position of a nearby motor vehicle.

11. The method as recited in claim 1, wherein the driver assistance function relates to at least one of a longitudinal controller and a transverse controller of the motor vehicle.

12. The method of claim 1, wherein the outputting of the notice includes an identification of an adequacy of the attentiveness of the vehicle driver for controlling the vehicle.

13. The method of claim 1, wherein the stimulus does not cause a sudden maneuver of the motor vehicle by the vehicle driver.

14. The method of claim 1, further comprising: prior to the detecting an input of the vehicle driver in response to the stimulus, outputting a prompt concerning the detected stimulus.

15. The method of claim 14, wherein the prompt includes a query for an estimation of a distance to an adjacent vehicle.

16. A computer program product, comprising:
   a program code for carrying out a method for interactive attentiveness enhancement of a vehicle driver when the computer program product runs on a processing unit or is stored on a computer-readable data carrier, the method comprising:
      determining that a driver assistance function for semi-automatic control of a motor vehicle is active;
      detecting a stimulus capable of being experienced by the vehicle driver upon an observation of surroundings of the motor vehicle;
      detecting an input of the vehicle driver in response to the stimulus;
      determining a game result based on the input and the stimulus, wherein the game result is a valuation of a degree of attentiveness of the vehicle driver; and
      outputting a notice concerning the game result.

17. A device for interactive attentiveness enhancement of a vehicle driver, comprising:
   a unit for detecting that a driver assistance function for semiautomatic control of a motor vehicle is active;
   a first interface for detecting a stimulus capable of being experienced by the vehicle driver upon an observation of surroundings of the motor vehicle;
   a second interface for connecting to an input unit on board the motor vehicle;
   a processing unit for determining a game result based on an input from the input unit and the stimulus, wherein the game result is a valuation of a degree of attentiveness of the vehicle driver; and
   a third interface for connecting to an output unit for outputting the game result.

18. The device as recited in claim 17, further comprising:
   a memory for accommodating a sequence controller of a game based on stimuli and inputs.

19. The device as recited in claim 18, further comprising:
   a fourth interface for receiving the sequence controller to be stored in the memory.

* * * * *